United States Patent
Tran et al.

(10) Patent No.: US 11,745,267 B2
(45) Date of Patent: Sep. 5, 2023

(54) ADDITIVE MANUFACTURING METHOD

(71) Applicant: NATIONAL CHENG KUNG UNIVERSITY, Tainan (TW)

(72) Inventors: Hong-Chuong Tran, Tainan (TW); Yu-Lung Lo, Tainan (TW); Haw-Ching Yang, Tainan (TW); Fan-Tien Cheng, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 187 days.

(21) Appl. No.: 17/356,544

(22) Filed: Jun. 24, 2021

(65) Prior Publication Data

US 2021/0402476 A1 Dec. 30, 2021

Related U.S. Application Data

(60) Provisional application No. 63/043,143, filed on Jun. 24, 2020.

(51) Int. Cl.
*B22F 10/364* (2021.01)
*B22F 10/37* (2021.01)
(Continued)

(52) U.S. Cl.
CPC ............ *B22F 10/364* (2021.01); *B22F 10/28* (2021.01); *B22F 10/37* (2021.01); *B22F 10/85* (2021.01);
(Continued)

(58) Field of Classification Search
CPC ........ B22F 10/364; B22F 10/85; B22F 10/37; B22F 10/28; B33Y 10/00; B33Y 50/02
See application file for complete search history.

(56) References Cited

U.S. PATENT DOCUMENTS

2019/0275585 A1* 9/2019 Akram ................... B22F 10/38
2019/0291209 A1* 9/2019 Khairallah ............ B23K 26/34
(Continued)

OTHER PUBLICATIONS

D. Bergström et al., "A ray-tracing analysis of the absorption of light by smooth and rough metal surfaces" Journal of Applied Physics, vol. 101, 2007, pp. 113504-1~113504-11.
(Continued)

*Primary Examiner* — Michael P Wieczorek
(74) *Attorney, Agent, or Firm* — CKC & Partners Co., LLC

(57) ABSTRACT

An additive manufacturing (AM) method is provided. The method includes performing a laser powder bed fusion (L-PBF) process on the powder layer. Then, a first surface roughness value of the powder layer after the L-PBF process is obtained to generate a first surface profile. An absorptivity and a set of re-melting process parameters data are used to perform a heat transfer simulation. A second surface profile of the powder layer after laser re-melting is obtained by using the first surface profile and a low-pass filter. Then, the set of re-melting process parameters data is adjusted iteratively to perform the heat transfer simulation until a second surface roughness value predicted from the second surface profile is smaller than or equal to a surface roughness threshold, thereby obtaining optimal values of re-melting process parameters for performing a re-melting process to reduce a surface roughness of a powder layer after the L-PBF process.

16 Claims, 11 Drawing Sheets

(51) Int. Cl.
*B22F 10/85* (2021.01)
*B22F 10/28* (2021.01)
*B33Y 50/02* (2015.01)
*B33Y 10/00* (2015.01)
*B33Y 40/20* (2020.01)

(52) U.S. Cl.
CPC .............. *B33Y 10/00* (2014.12); *B33Y 40/20* (2020.01); *B33Y 50/02* (2014.12)

(56) References Cited

U.S. PATENT DOCUMENTS

2020/0147893 A1   5/2020   Yang et al.
2020/0247064 A1   8/2020   Yang et al.

OTHER PUBLICATIONS

E. Ukar et al., "Roughness prediction on laser polished surfaces" Journal of Materials Processing Technology, vol. 212, 2012, pp. 1305-1313.

* cited by examiner

ADDITIVE MANUFACTURING METHOD

RELATED APPLICATION

This application claims priority to U.S. Provisional Application Ser. No. 63/043,143, filed Jun. 24, 2020, which is herein incorporated by reference in its entirety.

BACKGROUND

Field of Invention

The disclosure relates to an additive manufacturing (AM) method, and more particularly, to an additive manufacturing (AM) method with a laser re-melting process with optimal values of re-melting process parameters.

Description of Related Art

Additive manufacturing (AM), also referred to as 3D-printing, is a technique of heating metal powder particles or plastic material to be melt-shapeable after a digital computing model file is built, and then fabricating a workpiece by stacking layers. Additive manufacturing technology have grown rapidly in use in recent years due to their ability to produce functional components with highly complex structures in a rapid, versatile and low-cost manner with minimum metal powders waste. A laser powder bed fusion (L-PBF) process is one of the most common additive manufacturing techniques.

In the L-PBF process, 3D components with complex geometries are fabricated in a layer-by-layer fashion by using a controlled laser beam to selectively melt particular regions of the metal powder bed. However, due to the stochastic nature of the L-PBF process, the top surface roughness of each solidified layer tends to be different even when the optimal processing conditions for the different positions on the build plate are employed. As a result, the mechanical properties of the built components frequently vary from one component to the next. Thus, a laser polishing technique or a laser re-melting process is employed to reduce the surface roughness of each solidified layer.

However, the parameters used in the laser re-melting process for each layer are generally determined through experimental trial-and-error methods. Accordingly, there is a need to provide an additive manufacturing (AM) method for performing a laser re-melting process with optimal values of re-melting process parameters.

SUMMARY

An object of the invention is to provide an additive manufacturing (AM) method, thereby obtaining optimal values of re-melting process parameters by simulation, so as to effectively perform a re-melting process to reduce a surface roughness of a powder layer after the L-PBF process.

According to the aforementioned object, an aspect of the disclosure provides an additive manufacturing method. In the additive manufacturing method, at first, a powder bed is provided, in which the powder bed includes a substrate and a powder layer disposed on the substrate. Subsequently, a laser powder bed fusion (L-PBF) process is performed on the powder layer with a set of fusion parameters data. The set of fusion parameters data includes a first laser power value, a first scanning speed value, and a first hatching space value. A set of property data regarding the powder bed is obtained. The set of property data includes material properties and optical properties of a top surface of the powder layer. Then, a first surface roughness value of the top surface of the powder layer after the L-PBF process is obtained, and a first surface profile is generated from the first surface roughness value based on a Gaussian probability assumption. Thereafter, an absorptivity of the powder layer is obtained by using the first surface profile and the set of property data according to a bidirectional distribution reflection function (BRDF). A set of re-melting process parameters data is provided for performing a re-melting process on the powder layer. The set of re-melting process parameters data includes a second laser power value, a second scanning speed value, and a second hatching space value. Then, a heat transfer simulation is performed to simulate the re-melting process, thereby obtaining a temperature distribution and an average melting period in a melt pool region by using the set of re-melting process parameters data, the set of property data, and the absorptivity of the powder layer. A cut-off frequency is calculated by using the average melting period and the set of property data, thereby obtaining a low-pass filter. Subsequently, a second surface profile of the top surface of the powder layer after laser re-melting is obtained by using the first surface profile and the low-pass filter. Then, a second surface roughness value of the top surface of the powder layer after laser re-melting is predicted based on the second surface profile. The set of re-melting process parameters data is adjusted iteratively to perform the heat transfer simulation until the second surface roughness value is smaller than or equal to a surface roughness threshold. Then, a laser re-melting process is performed on the top surface of the powder layer with the set of re-melting process parameters data after the L-PBF process.

In some embodiments, the first surface roughness value is obtained by using a virtual metrology method.

In some embodiments, the virtual metrology method is based on a neural network algorithm, a multiple regression algorithm, a back propagation neural network (BPNN) algorithm, a general regression neural network (GRNN) algorithm, a radial basis function neural network (RBFNN) algorithm, a simple recurrent network (SRN) algorithm, a support vector data description (SVDD) algorithm, a support vector machine (SVM) algorithm, a multiple regression (MR) algorithm, a partial least squares (PLS) algorithm, a nonlinear iterative partial least squares (NIPALS) algorithm, or a generalized linear models (GLMs).

In some embodiments, the step of predicting the second surface roughness value includes converting the first surface profile from a spatial domain to a frequency domain by a fast Fourier transform (FFT) algorithm. Then, the low-pass filter is applied to the first surface profile in the frequency domain, thereby obtaining the second surface profile in the frequency domain. The step further includes converting the second surface profile from the frequency domain to the spatial domain by a fast Fourier transform algorithm. Then, the second surface roughness value is calculated from the second surface profile in the spatial domain.

In some embodiments, the additive manufacturing method further includes obtaining plural melting periods corresponding to plural nodal points in the melt pool region by using the temperature distribution. Then, the average melting period is calculated by using the melting periods and the nodal points.

In some embodiments, the heat transfer simulation is a finite element heat transfer simulation.

Another aspect of the disclosure provides an additive manufacturing (AM) method of performing a laser re-melting process. The method comprises obtaining a plurality of first roughness values of at least one powder layer which has been processed by a laser powder bed fusion (L-PBF) process with a set of fusion parameters data. The set of fusion parameters data includes a first laser power value, a first scanning speed value, and a first hatching space value. Then, a simulation operation with respect to each of the first surface roughness values is performed on each of the at least one powder layer, thereby obtaining a re-melting operation table. The re-melting operation table includes plural sets of re-melting process parameters data corresponding to the first surface roughness values in a one-to-one manner. The simulation operation includes obtaining a set of property data regarding one of the at least one powder layer, in which the set of property data includes material properties and optical properties of each of the at least one powder layer. A first surface profile is generated from one of the first surface roughness values based on a Gaussian probability assumption. Then, an absorptivity of one of the powder layer is obtained by using the first surface profile and the set of property data according to a bidirectional distribution reflection function (BRDF). A set of re-melting process parameters data is provided for performing a re-melting process on the one of the at least one powder layer, in which the set of data of re-melting process parameters includes a second laser power value, a second scanning speed value, and a second hatching space value. Then, a heat transfer simulation to simulate the re-melting process is performed, thereby obtaining a temperature distribution in a melt pool region and an average melting period by using the set of re-melting process parameters data, the set of property data, and the absorptivity of the one of the at least one powder layer. A cut-off frequency is calculated by using the average melting period and the set of property data, thereby obtaining a low-pass filter. Subsequently, a second surface profile of the one of the powder layer is obtained by using the first surface profile and the low-pass filter. A second surface roughness value of the one of the at least one powder layer is predicted based on the second surface profile. The simulation operation includes iteratively adjusting the set of re-melting process parameters data to perform the heat transfer simulation until the second surface roughness value of the one of the at least one powder layer is smaller than or equal to a surface roughness threshold. After the simulation operation, another roughness value of a top surface of another powder layer is obtained after the L-PBF process is performed on the top surface of another powder layer. Another set of re-melting process parameters data is looked up by the another roughness value in the re-melting operation table, thereafter performing a laser re-melting process on the top surface of the another powder layer with the another set of re-melting process parameters data after the L-PBF process.

In some embodiments, the first roughness values are located on the same powder layer.

In some embodiments, the first roughness values are located on different powder layers.

In some embodiments, the first roughness values are obtained by using a virtual metrology method.

In some embodiments, the another roughness value is obtained by using a virtual metrology method.

In some embodiments, the virtual metrology method is based on a neural network algorithm, a multiple regression algorithm, a back propagation neural network (BPNN) algorithm, a general regression neural network (GRNN) algorithm, a radial basis function neural network (RBFNN) algorithm, a simple recurrent network (SRN) algorithm, a support vector data description (SVDD) algorithm, a support vector machine (SVM) algorithm, a multiple regression (MR) algorithm, a partial least squares (PLS) algorithm, a nonlinear iterative partial least squares (NIPALS) algorithm, or a generalized linear models (GLMs).

In some embodiments, the first roughness values are located on different powder layers that are disposed on different substrates respectively.

In some embodiments, the step of predicting the second surface roughness value includes converting the first surface profile from a spatial domain to a frequency domain by a fast Fourier transform (FFT) algorithm. Then, the low-pass filter is applied to the first surface profile in the frequency domain, thereby obtaining the second surface profile in the frequency domain. The step further includes converting the second surface profile from the frequency domain to the spatial domain by a fast Fourier transform algorithm. Then, the second surface roughness value is calculated from the second surface profile in the spatial domain.

In some embodiments, the heat transfer simulation further includes obtaining plural melting periods corresponding to plural nodal points in the melt pool region by using the temperature distribution. Then, the average melting period is calculated by using the melting periods and the nodal points.

In some embodiments, the heat transfer simulation is a finite element heat transfer simulation.

Therefore, with the application of the additive manufacturing method of the disclosure, the quality of laser powder bed fusion processed workpiece can be improved through controlling the surface roughness of every layer.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
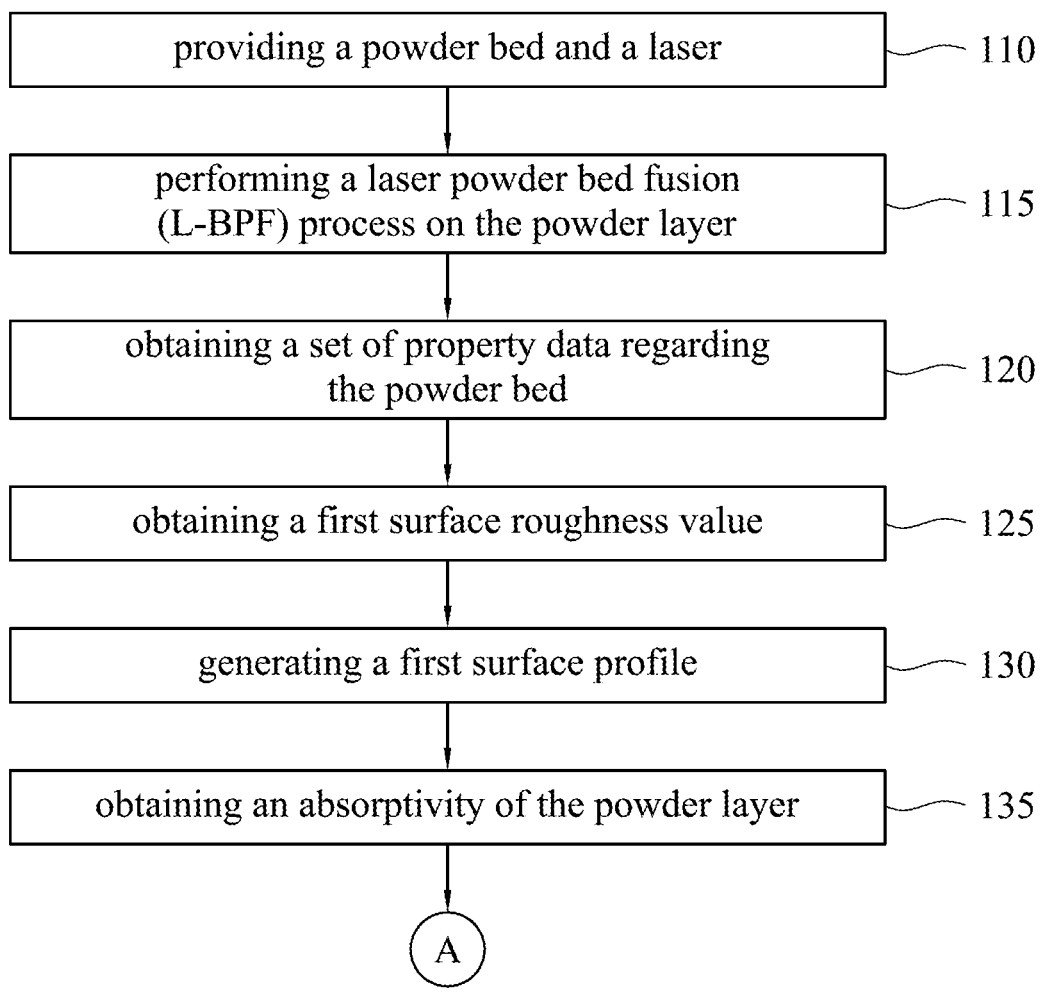
FIG. 1A and FIG. 1B illustrate a schematic flow chart showing an additive manufacturing (AM) method according to some embodiments of the disclosure.

Reference will now be made in detail to the present embodiments of the invention, examples of which are illustrated in the accompanying drawings. Wherever possible, the same reference numbers are used in the drawings and the description to refer to the same or like parts.

Though there are systems for monitoring occurrence of flaws such as pore formation and excessive surface roughness in individual melted powder layers during a laser powder bed fusion process, it is needed to have a method to combine with the systems that can actually modify the powder layer for the laser powder bed fusion process.

Figure 1B:
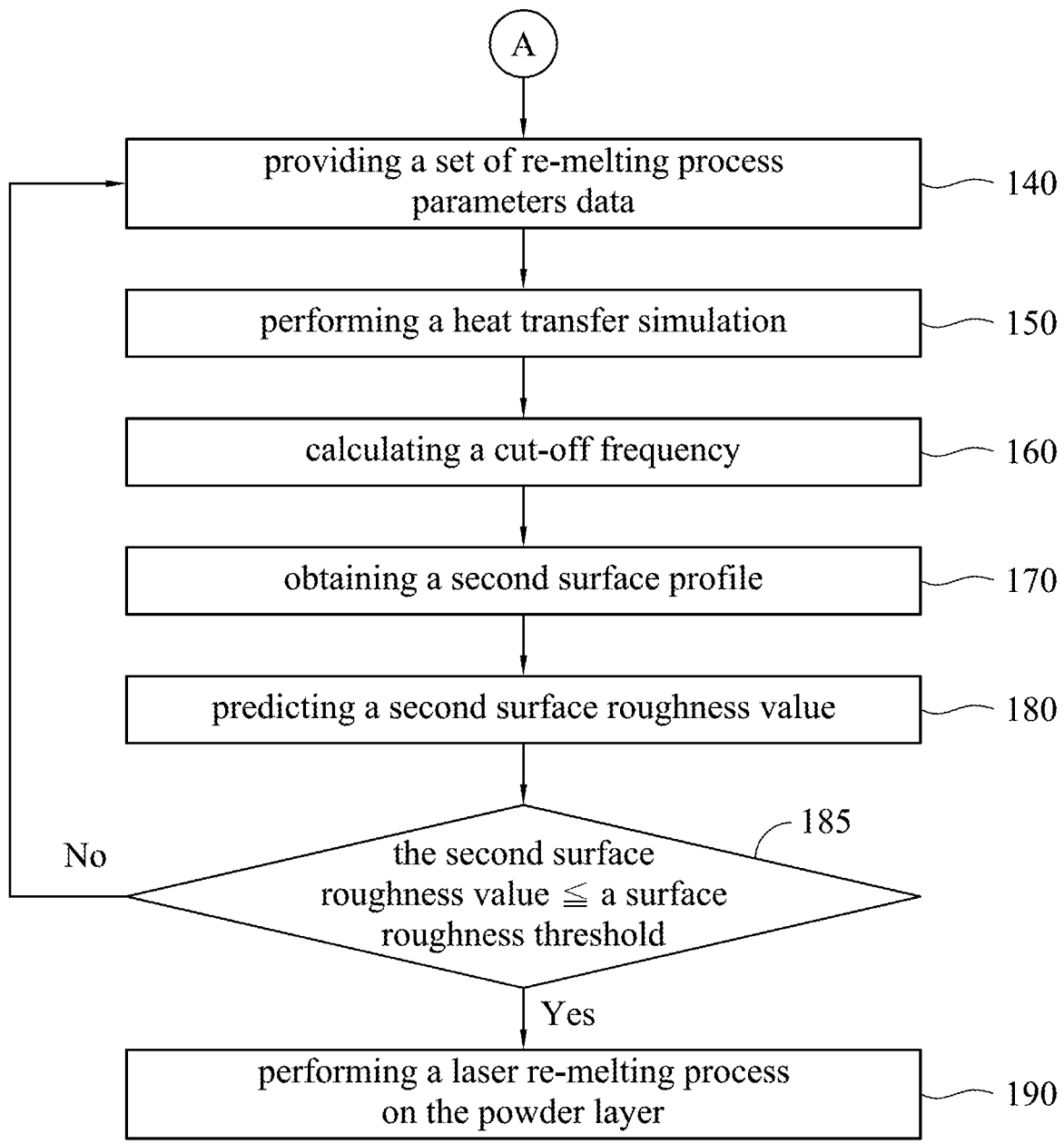
Figure 2:
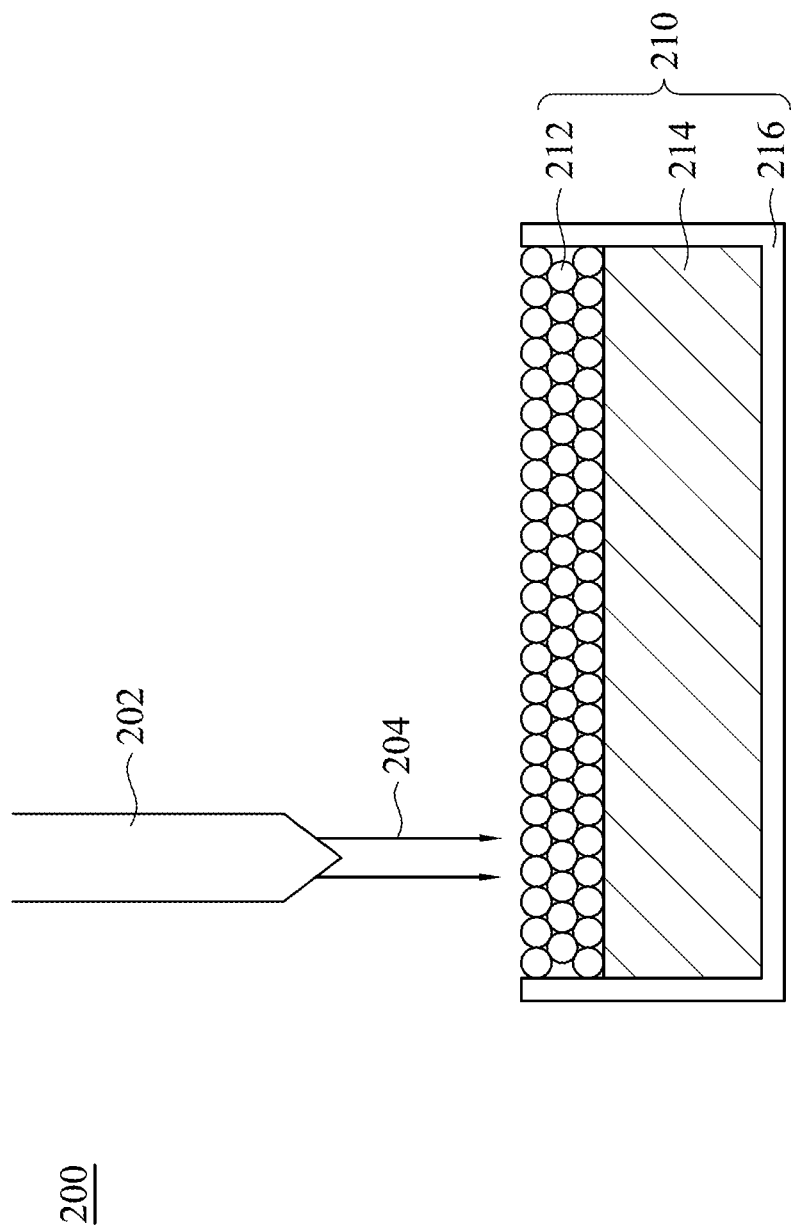
FIG. 2 is a schematic diagram showing an additive manufacturing (AM) tool on a process stage according to some embodiments of the disclosure.

Referring to FIG. 1A, FIG. 1B and FIG. 2, in which FIG. 1A and FIG. 1B illustrate a schematic flow chart of an additive manufacturing (AM) method 100, while FIG. 2 is a schematic diagram showing an additive manufacturing (AM) tool 200 on a process stage according to some embodiments of the disclosure. In operation 110, a powder bed and a laser are provided. In some embodiments, as shown in FIG. 2, the device 200 includes the powder bed 210 in a powder bed container 216, in which the powder bed 210 includes plural powder layers 212 deposited on a substrate 214. Besides, each powder layer 212 includes plural material powders.

Subsequently, operation 115 is performed to perform a laser powder bed fusion (L-PBF) process on a top surface of the powder layer 212 by using a laser 202 with a set of fusion parameters data, as shown in FIG. 2. In some embodiments, the set of fusion parameters data includes a first laser power values, a first scanning speed value, and a first hatching space value. In some embodiments, after the powder layer 212 is irradiated by the laser 202, the powder layer 212 is melted and solidified, and thus a solidified layer is obtained. In some embodiments, there are plural powder layer regions on the substrate. During the laser powder bed fusion process on the powder layer 212, a laser 202 is used to provide a laser beam 204 to the respective powder layer regions of the powder bed 210, and the powder layer 212 are melted to form and obtain a desired profile of a product by controlling specific parameters. When the powders in the respective powder regions are melted, plural melt pools are formed on the powder bed 210.

Then, operation 120 is performed to obtain a set of property data regarding the powder bed (e.g. powder bed 210). In some embodiments, the set of property data includes material properties and optical properties of a top surface of the powder layer. In some embodiments, the material properties includes but not limit to a thermal conductivity, a density, a specific heat, a solidus temperature, and a liquidus temperature. In some embodiments, the optical properties includes but not limit to a refractive index of the material powders for different laser wavelengths.

Referring to FIG. 1A, operation 125 is performed to obtain a first surface roughness value of the top surface of the powder layer after the L-PBF process. In some embodiments, the first surface roughness value is obtained by using a virtual metrology method. In some embodiments, the virtual metrology method is based on a neural network algorithm, a multiple regression algorithm, a back propagation neural network (BPNN) algorithm, a general regression neural network (GRNN) algorithm, a radial basis function neural network (RBFNN) algorithm, a simple recurrent network (SRN) algorithm, a support vector data description (SVDD) algorithm, a support vector machine (SVM) algorithm, a multiple regression (MR) algorithm, a partial least squares (PLS) algorithm, a nonlinear iterative partial least Squares (NIPALS) algorithm, or a generalized linear models (GLMs). In some embodiments, the first surface roughness value is obtained by using a surface roughness tester.

Figure 3A:
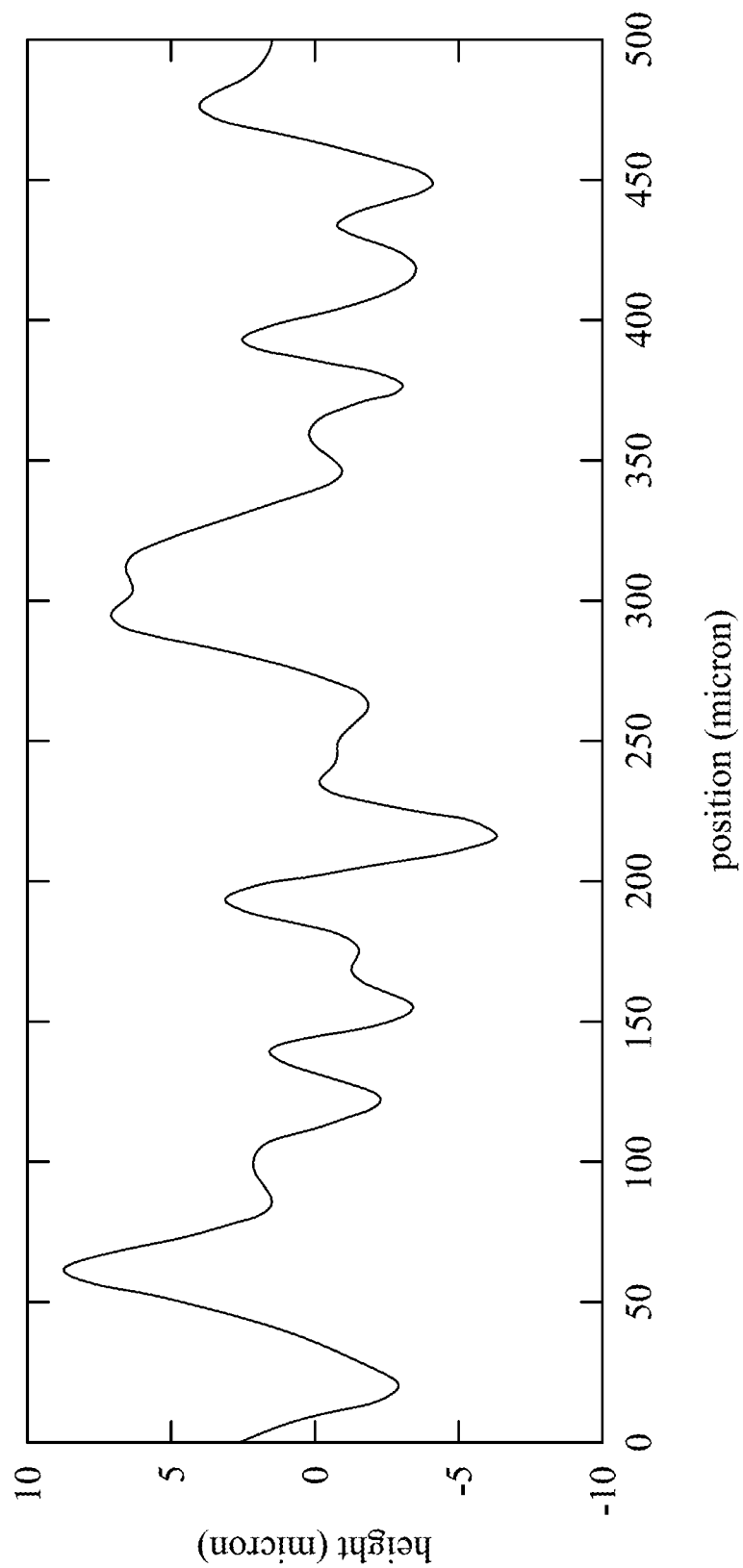
FIG. 3A and FIG. 3B show simulated profiles for different average surface roughness values according to some embodiments of the disclosure.
Figure 3B:
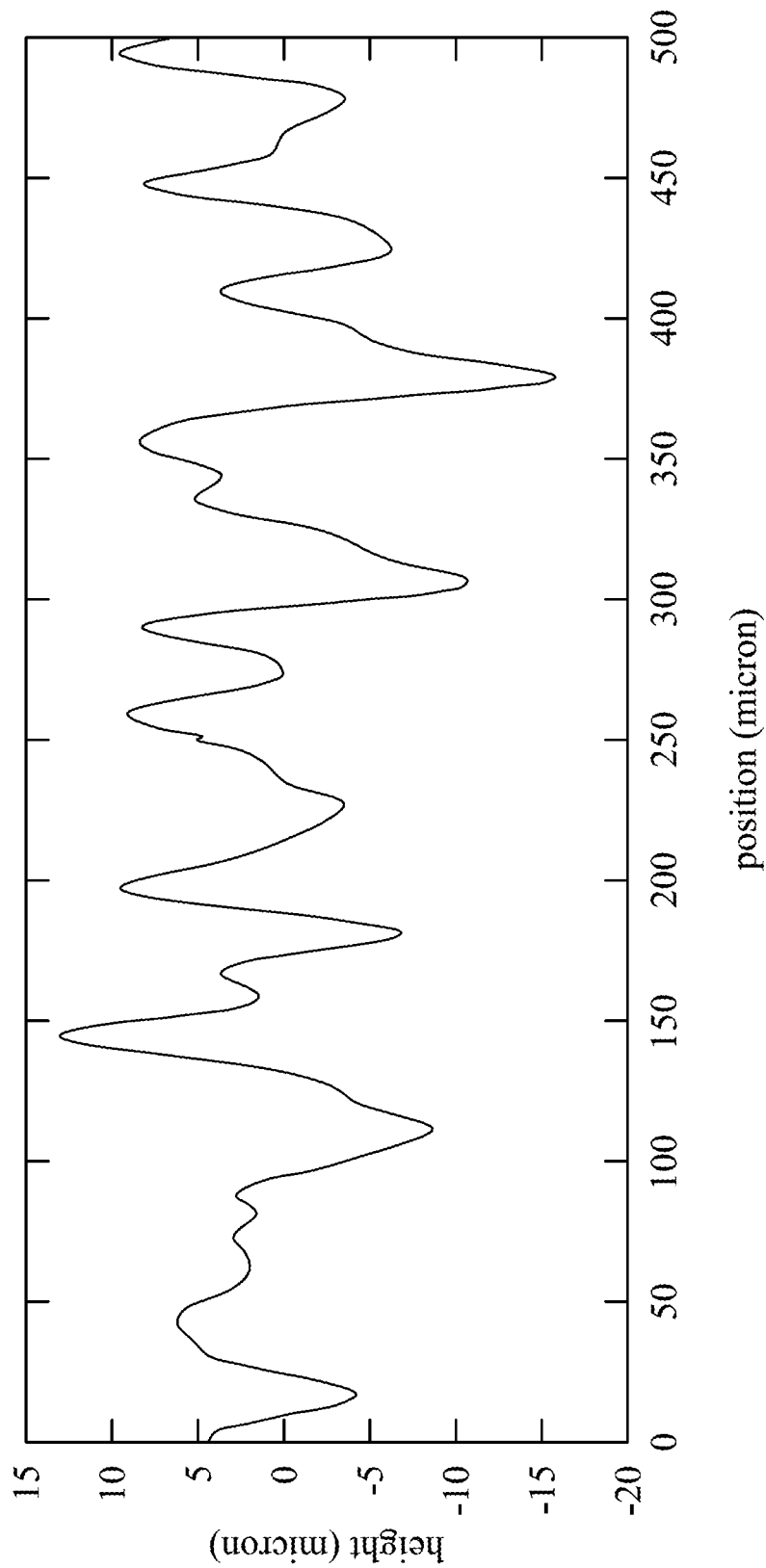

Operation 130 is performed to construct a first surface profile from the first surface roughness value obtained by operation 125. In some embodiments, operation 130 is based on a Gaussian probability assumption. For example, according to some embodiments of the disclosure, FIG. 3A and FIG. 3B show the simulated profiles for average surface roughness values of Ra=2.49 μm and Ra=5.07 μm, respectively. On the other hand, a method to generate the surface profile is modeling a random rough surface by one dimensional function, and the function is described in statistical terms by using two distribution functions, a height probability distribution and an autocovariance function. The height probability distribution describes surface height deviation from a certain mean reference value, while the autocovariance function describes variance of these heights laterally along the surfaces. In some embodiments, equation (1) is a commonly used model to approximate the height probability distribution as a Gaussian.

$$p(\zeta) = \frac{1}{\sigma\sqrt{2\pi}} e^{-\zeta^2/2\sigma^2} \tag{1}$$

where σ is a root mean square (rms) height (surface roughness Ra), which equal a standard deviation, and ζ is height function. In some embodiments, the autocovariance function can be defined as equation (2):

$$C(\tau) = \langle \zeta(x_1)\zeta(x_2) \rangle = \sigma^2 \exp\left(-\frac{|x_1 - x_2|^2}{\tau^2}\right) \tag{2}$$

where $x_1$ and $x_2$ are two different points along the surface, and τ is correlation length.

The disclosure utilizes and incorporates by reference the mathematical models proposed by D. Bergström, J. Powell, and A. Kaplan, "A ray-tracing analysis of the absorption of light by smooth and rough metal surfaces," Journal of applied physics, vol. 101, p. 113504, 2007.

After the first surface profile is generated, it is hypothesized that when laser irradiates on the surfaces with different surface roughness values, absorption will be different. Then, operation 135 is performed to obtain an absorptivity of the powder bed according to a bidirectional distribution reflection function (BRDF). In some embodiments, the first surface profile and the set of property data are used to obtain the absorptivity. When performing the laser powder bed fusion process or a laser re-melting process on the powder bed, the laser beam irradiates the surface of the solidified layer, part of the laser beam energy is absorbed by metal particles, while remaining energy is scattered back. Typically, the amount of laser energy to be absorbed is significantly dependent on the surface roughness of the powder bed and optical properties of the metal particles. In particular, for rough surfaces (e.g. with greater surface roughness value), degrees of interaction between the laser beam and surface morphology increase dramatically, and hence the amount of the laser energy absorbed by the powder bed increases. Therefore, the effects of the surface morphology on the laser absorption should be considered.

The BRDF algorithm used in operation 135 may be as equation (3), $$\rho''_\lambda(\Omega_s, \Omega_i) = \frac{\pi}{\cos(\theta_s)} \left( \frac{d\varphi_s/d\Omega_s}{d\varphi_i/d\Omega_i} \right) \quad (3)$$

where $\theta_s$ is an angle of the scattered light; $\varphi_s$ and $\varphi_i$ are incident and scattered radiant powers, respectively; and $\Omega_i$ and $\Omega_s$ are the incident angles and solid angles, respectively. Integrating equation (3) over entire hemisphere leads to following expression for directional hemispherical reflectance:

$$\rho'_\lambda(\Omega_i) = \frac{1}{\pi} \int_{2\pi} \rho''_\lambda(\Omega_s, \Omega_i) \cos(\theta_s) d\Omega_s \quad (4)$$

The absorption function of the surface is then obtained as equation (5):

$$A'_\lambda(\Omega_i) = 1 - \rho'_\lambda(\Omega_i) \quad (5).$$

Figure 4B:
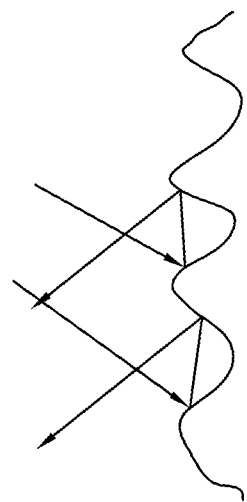
FIG. 4A and FIG. 4B show interactions between laser irradiation energy and powder layers with a perfect smooth surface and a rough surface, respectively.
Figure 4A:
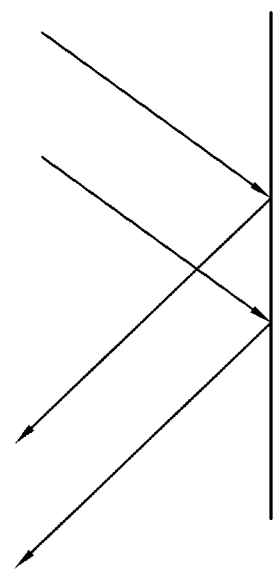

It is seen that the absorptivity increases significantly with an increasing surface roughness since a higher roughness results in a greater number of "hill" and "valley" structures, which leads in turn to a greater interaction between the laser radiation energy and the surface as shown in FIG. 4A and FIG. 4B, which show interactions between laser irradiation energy and the powder layer with perfect smooth surface and rough surface, respectively. For example, when the surface roughness is 2.5 μm, the calculated absorptivity is about 0.35; when the surface roughness is 4.98 μm, the calculated absorptivity is about 0.41.

Referring to FIG. 1B, operation 140 is performed to provide a set of re-melting process parameters data of the laser for performing a re-melting process on the powder layer. In some embodiments, the set of re-melting process parameters data includes a second laser power value, a second scanning speed value, and a second hatching space value.

Operation 150 is then performed to perform a heat transfer simulation. In some embodiments, the heat transfer simulation is a heat transfer finite element (FE) simulation for simulating the re-melting process, thereby obtaining a temperature distribution in a melt pool region. In some embodiments, the set of property data (e.g. obtained by operation 120), the absorptivity of the powder layer (e.g. obtained by operation 135), and the set of re-melting process parameters data (e.g. obtained by operation 140) are adopted to perform the heat transfer simulation.

In some embodiments, the governing equation for the heat transfer in the melt pool of the powder bed can be written as:

$$\rho c \frac{dT}{dt} = Q + \frac{d}{dx}\left(k_{xx}\frac{dT}{dx}\right) + \frac{d}{dy}\left(k_{yy}\frac{dT}{dy}\right) + \frac{d}{dz}\left(k_{zz}\frac{dT}{dz}\right) \quad (6)$$

where ρ represents material density (kg/m$^3$), c represents specific heat (J/kg-K), T represents temperature (K), and Q represents heat generation per unit volume (W/m$^3$). In an example, the powder layer and the substrate are assumed to have an initial temperature of 293K. Meanwhile, the boundary condition for the heat transfer on the top surface is set as:

$$k_n \frac{\partial T}{\partial n} - q_{laser} + h(T - T_a) + \sigma\varepsilon(T^4 - T_a^4) = 0 \quad (7)$$

where $k_n$ represents thermal conductivity in a direction normal to the surface, $h_c$ represents the heat transfer coefficient (for example, $h_c$=100 W/m$^2$-K), $T_a$ represents an ambient temperature (for example, $T_a$=293 K), σ represents Stefan constant (which is 5.669×10$^{-8}$ W/m$^2$-K), and ε represents emissivity (e.g. 0.4 for solid state and 0.1 for molten material). Specifically, $h(T-T_a)$ is heat loss due to convection, while $\sigma\varepsilon(T^4-T_a^4)$ is heat loss due to radiation. Moreover, $q_{laser}$ represents the absorbed laser energy and is formulated as equation (8).

$$q(x, y, z, t) = \frac{2AP}{\pi r_0^2} \exp\left[-\frac{2[(x-vt)^2 + y^2]}{r_0^2}\right] \quad (8)$$

In equation (8), P is the laser power, $r_0$ is radius of the laser beam, v is the laser scanning speed, x, y, and z are coordinates of the simulation domain, and A is the absorptivity calculated in the above. Notably, the simulation takes account of both the phase change event which occurs when the material transits from bulk material to liquid and from liquid to vapor, and the effect of Marangoni convection on the formation of the melt pool by means of anisotropic thermal conductivity.

Moreover, operation 150 is also performed for obtaining an average melting period. It is understood that the melting period is the time for which the material remains in the liquid state. In some embodiments, steps for obtaining an average melting period includes obtaining a plurality of melting periods corresponding to a plurality of nodal points in the melt pool region by using the temperature distribution. Then, the average melting period is calculated by using the melting periods and the nodal points, as shown in equation (9):

$$T_m = \frac{\sum_{i=1}^{N} T_m^i}{N} \quad (9)$$

where $T_m^i$ is the melting period of individual nodal point and N is total number of nodal points in the melt pool.

Operation 160 is performed to calculate a cut-off frequency. In some embodiments, the set of property data (e.g. obtained by operation 120) and the average melting period (e.g. obtained by operation 150) are used to calculate the cut-off frequency according to equation (10):

$$f_{cr} = \sqrt{\frac{\rho}{8\pi^2 \mu T_m}} \quad (10)$$

where $f_{cr}$ represents cut-off frequency (1/mm), μ represents dynamic viscosity (Ns/m$^2$), ρ represents density (kg/m$^3$), and $T_m$ represents melting period. It is known that both of dynamic viscosity and density are included in the set of property data. For example, table 1 shows the cut-off frequency for three sets of laser re-melting process parameters data.

TABLE 1

| laser power (W) | scanning speed (mm/s) | cut-off frequency (Hz) |
| --- | --- | --- |
| 150 | 600 | 6638.8 |
| 180 | 680 | 6394.3 |
| 200 | 750 | 6488.8 |

The disclosure utilizes and incorporates by reference the mathematical models proposed by E. Ukar, A. Lamikiz, S. Martínez, I. Tabernero, and L. L. De Lacalle, "Roughness prediction on laser polished surfaces," Journal of Materials Processing Technology, vol. 212, pp. 1305-1313, 2012.

Figure 5:
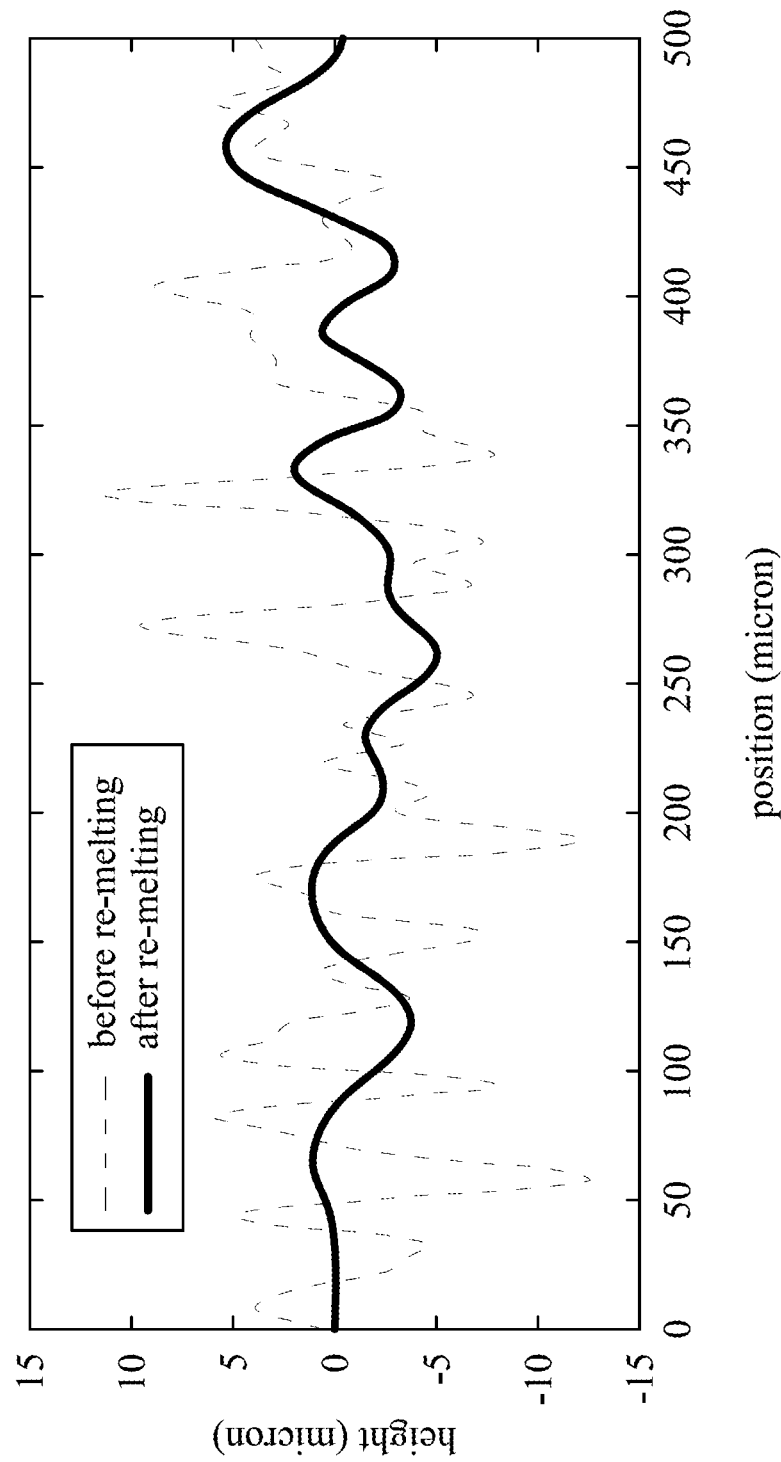
FIG. 5 shows a surface profiles before and after laser re-melting according to some embodiments of the disclosure.

Afterwards, operation 170 is performed to obtain a second surface profile of the top surface of the powder layer after laser re-melting. In some embodiments, the first surface profile and the low-pass filter with the cut-off frequency are used to predict the second surface profile after laser re-melting. Referring to FIG. 5, FIG. 5 shows a surface profile before and after laser re-melting, in which the surface profile before laser re-melting is obtained after L-PBF process with the laser power of 150 W and the scanning speed of 600 mm/s, while the surface after laser re-melting is the simulated profile obtained after applying the low pass filter in the frequency domain. It can be seen that the laser re-melting process reduces average surface roughness value from 4.5 μm to 2.8 μm. It is understood that the low-pass filter can let lower frequency pass but blocking higher frequency. Therefore, the second surface profiles are composed of lower frequency signal.

Operation 180 is then performed to predict a second surface roughness value of the top surface of the powder layer after laser re-melting. The second surface roughness value is based on the second surface profile obtained by operation 170. In some embodiments, the step of predicting the second surface roughness value includes converting the first surface profile from a spatial domain to a frequency domain by a fast Fourier transform (FFT) algorithm. Subsequently, the low-pass filter is applied to the first surface profile in the frequency domain, thereby obtaining the second surface profile in the frequency domain. Then, the second surface profile in frequency domain should be converted to the spatial domain by a fast Fourier transform (FFT) algorithm. Afterwards, the second surface roughness values are calculated from the second surface profile in the spatial domain.

Figure 6:
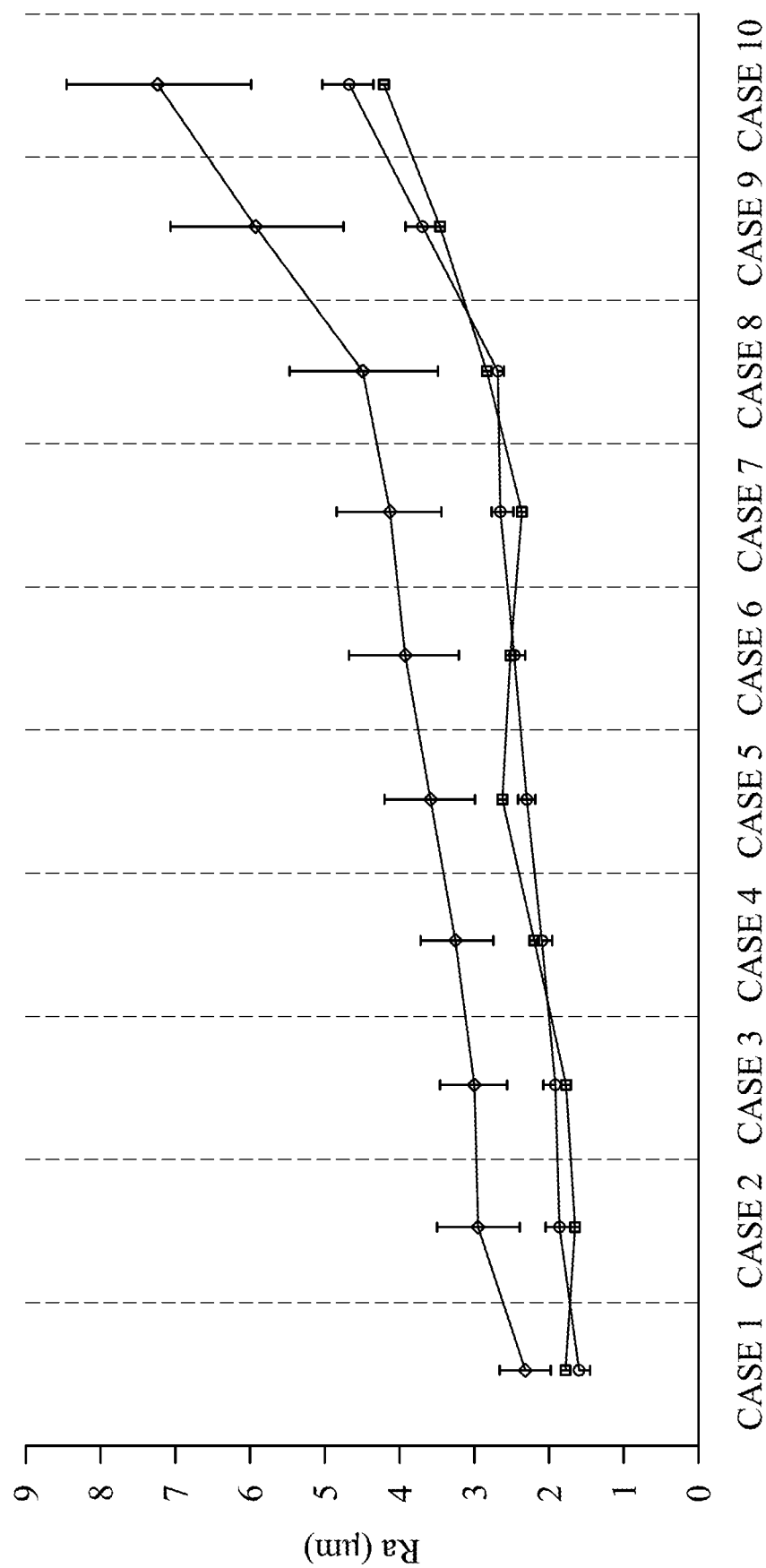
FIG. 6 shows surface roughness values before laser re-melting, experimental and simulated surface roughness values after laser re-melting with different sets of laser re-melting parameters data according to some embodiments of the disclosure.

Referring to FIG. 6, FIG. 6 shows the first surface roughness values (represented by diamonds), the second surface roughness values (simulated) (represented by circles), and the surface roughness values (measured) (represented by squares) after laser re-melting process in different cases with different sets of laser re-melting parameters data. In case 1 to case 6, the laser re-melting parameters data is the laser power of 150 W and the scanning speed of 600 mm/s; while in case 7 and case 8, the laser re-melting parameters data is the laser power of 190 W and the scanning speed of 880 mm/s, and in case 9 and case 10, the laser re-melting parameters data is the laser power of 190 W and the scanning speed of 700 mm/s. As shown in FIG. 6, the surface roughness values are literally reduced after laser re-melting. Moreover, differences between the simulated surface roughness values and the measured surface roughness values deviate by no more than 12.3%.

Then, operation 185 is performed to compare the second surface roughness value and a surface roughness threshold. Therefore, operations 140 to 180 are repeated until the second surface roughness value is smaller than or equal to a surface roughness threshold. In some embodiments, the surface roughness threshold is 2.8 μm. If the second surface roughness value is greater than the surface roughness threshold, it means that the set of re-melting process parameters data should be adjusted, so that arrow with "No" is followed to repeat from operation 140. On the other hand, if the second surface roughness value is smaller than or equal to the surface roughness threshold, it means that the set of re-melting process parameters data is suitable for the re-melting process, and operation 190 is performed to perform a laser re-melting process on the top surface of the powder layer after the L-PBF process. In some embodiments, the laser re-melting process is performed with the set of re-melting process parameters data.

Figure 7:
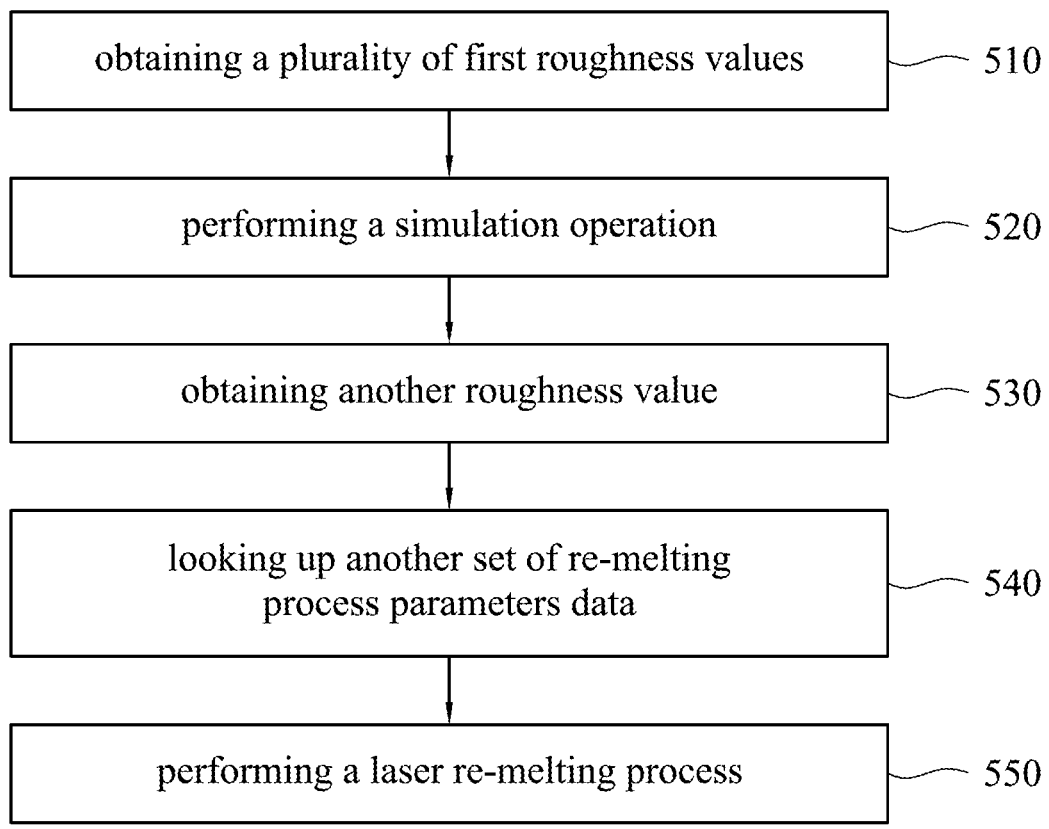
FIG. 7 shows a flow chart of an additive manufacturing method according to some embodiments of the disclosure.

Referring to FIG. 7, FIG. 7 shows a flow chart of an additive manufacturing method 500 of performing a laser re-melting process according to some embodiments of the disclosure. At first, operation 510 is performed to obtain first roughness values of at least one powder layer, which has been processed by a laser powder bed fusion (L-PBF) process. In some embodiments, the laser powder bed fusion is performed with a set of fusion parameter data, in which the set of fusion parameters data includes a first laser power value, a first scanning speed value, and a first hatching space value. In some embodiments, the first roughness values are located on the same powder layer or different powder layers. In some embodiments, the first roughness values are located on different powder layers that are disposed on different substrates respectively. In some embodiments, the first roughness values are obtained by using a virtual metrology method.

Then, operation 520 is performed to perform a simulation operation with each of the first surface roughness value, which is obtained by operation 510. Therefore, a re-melting operation table including sets of re-melting process parameters data is obtained. The sets of re-melting process parameters data is corresponding to the first roughness values in a one-to-one manner. In some embodiments, the simulation operation comprises steps similar to operations 120-185. For clarity, the simulation operation is omitted herein.

Subsequently, operation 530 is performed to obtain another roughness value of a top surface of another powder layer after the L-PBF process is performed on the top surface of another powder layer. In some embodiments, the another roughness value is obtained by using a virtual metrology method. Then, operation 540 is performed to look up another set of re-melting process parameters data in the re-melting operation table. That is, the another set of re-melting process parameters data is determined by using the another roughness value. Table 2 shows a re-melting operation table according to some embodiments of the disclosure. For example, if the another roughness values obtained by the virtual metrology method is 2.9 μm, the re-melting process parameters data should be determined that laser power is 160 W, scanning speed is 700 mm/s, and hatching space is 100 μm.

TABLE 2

| roughness value (μm) | laser power (W) | scanning speed (mm/s) | hatching space (μm) |
| --- | --- | --- | --- |
| 2.9-4 | 160 | 700 | 100 |
| 4-4.5 | 190 | 880 | 100 |
| >4.5 | 190 | 700 | 100 |

Afterwards, operation 550 is performed to perform a laser re-melting process on the top surface of the another powder layer after the L-PBF process with the set of re-melting process parameters data. It is understood that if the another roughness value is smaller than or equal to a roughness threshold (which is 2.8 µm in some embodiments), the laser re-melting process may be omitted for the another powder layer. Moreover, operation 530 to operation 550 may be repeated until a desired product is obtained. That is, numbers of laser powder bed fusion process and laser re-melting process depends on the final products.

Figure 8:
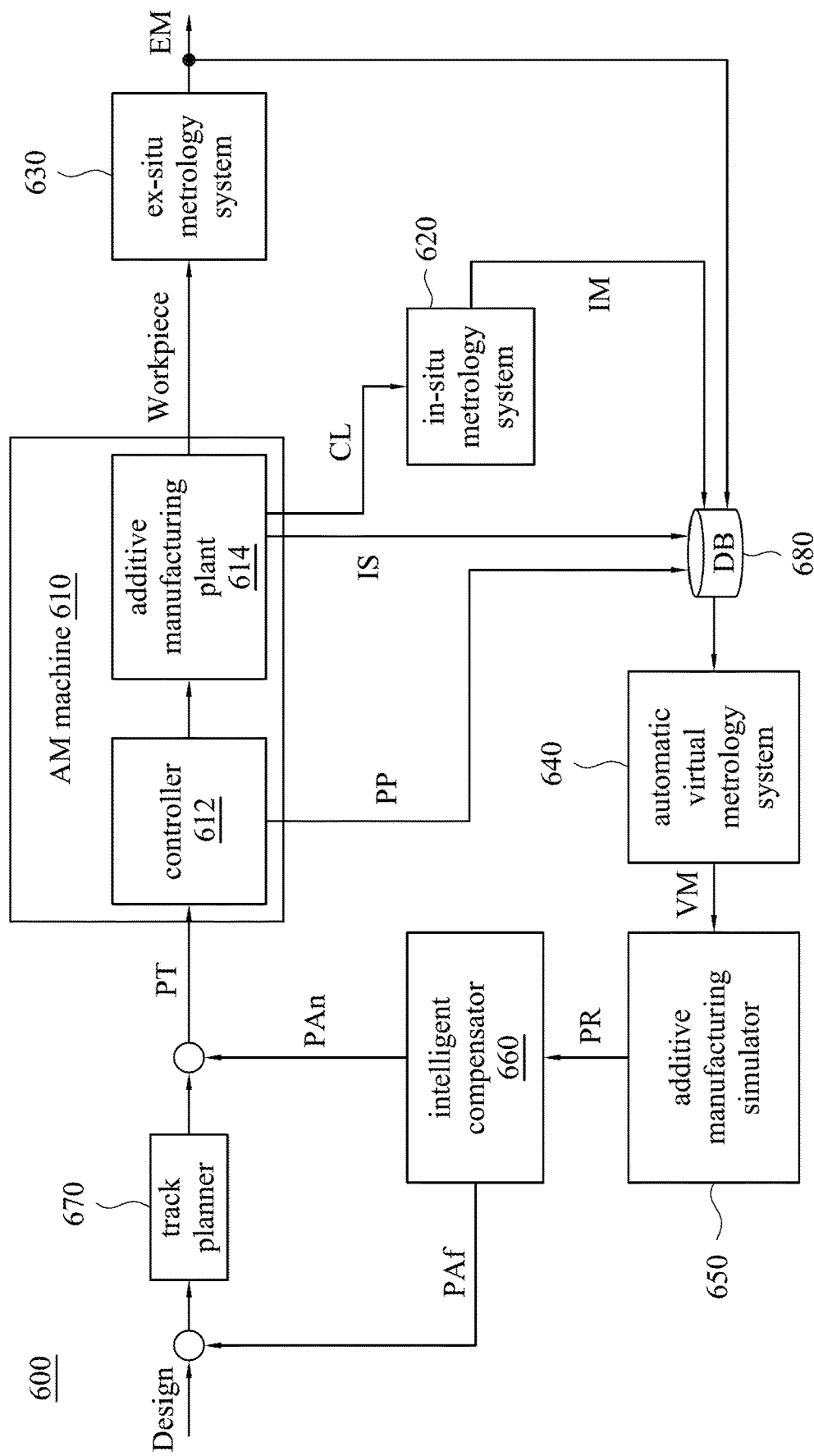
FIG. 8 is a schematic block diagram showing an intelligent additive manufacturing architecture (IAMA) according to some embodiments of the disclosure.

In some embodiments, the method 100 and 500 can be used to develop an intelligent additive manufacturing architecture (IAMA) for controlling the surface roughness of each layer of the powder bed in the laser powder bed fusion process. Referring to FIG. 8, FIG. 8 is a schematic diagram showing the intelligent additive manufacturing architecture 600 according to some embodiments of the disclosure. The IAMA 600 includes an additive manufacturing (AM) machine 610, an in-situ metrology (ISM) system 620, an ex-situ metrology (ESM) system 630, an automatic virtual metrology system 640, an additive manufacturing simulator 650, an intelligent compensator 660, and a track planner 670, among which the additive manufacturing machine 610 includes a controller 612 and an additive manufacturing plant 614.

FIG. 8 illustrates the basic concept of the IAMA 600. The in-situ metrology system 620 uses a co-axial high-speed camera and pyrometer to observe the melt pool and measure radiation intensity emitted from the melt pool, respectively. The ex-situ metrology system 630 is configured to collect ex-situ data of manufactured samples such as melt pool dimension from experiment. The track planner 670 utilize a materialize software to generate planned laser scanning path for each layer based on design demand, off-machine parameter adjustment ($PA_f$), and recommended parameter range (PR). The controller 612 of the AM machine 610 modifies the planned track in accordance with on-machine parameter adjustment ($PA_n$) and exports process data (PD) with actual required values of the power and scanning speed to the AM plant 614.

Database (DB) 680 collects and manages the data produced by the in-situ metrology system 620 (which is in-situ metrology data IM), the controller 612 (which is process parameter PP), the AM plant 614 (which is in-situ sensing data IS) and ex-situ metrology system 630 (which is ex-situ metrology data EM), and provides this data to the AVM system 640, and then the AVM system 640 may predict the surface roughness values of the top surface of each layer on the powder bed, as described above, and is passed to the intelligent compensator 660, which then selects the appropriate laser re-melting parameters data from the re-melting operation table. If the surface roughness values are greater than the surface roughness threshold (for example, 2.8 µm), the AVM system 640 forwards the surface roughness value to the AM simulator 650. Based on the received surface roughness information, the AM simulator 650 obtain the set of laser re-melting parameters data (e.g. the laser power and the scanning speed) required to restore the surface roughness to a value less than the surface roughness threshold. Finally, the set of laser re-melting parameters data are transferred to the intelligent compensator 660, which produces a control signal to adjust the processing parameters set by the track planner 670 for the laser re-melting process.

In some embodiments, the in-situ metrology system 620 detects manufacturing variances by monitoring change in shape of the melt pool (as observed by a co-axial high-speed CMOS camera) and the reflected radiant intensity (as measured by a co-axial pyrometer). Moreover, a laser spot position, melt pool image features, and temperature data are transferred to the automatic virtual metrology system 640, which then predict the surface roughness, as described above. The in-situ metrology system 620 used in the embodiments of the disclosure may be based on U.S. Patent Publication No. 20200147893 and U.S. Patent Publication No. 20200247064, which are hereby incorporated by reference.

As described above, the AVM system 640 predicts the surface roughness values of each layer in the powder bed in accordance with the data received from the in-situ metrology system 620 and from the ex-situ metrology system 630. In some embodiments, the AVM system 640 uses two prediction algorithm, namely a non-linear Partial Least Squares Regression/Multiple Regression (PLS/MR) algorithm and a linear neural network (NN) algorithm. However, another algorithm is also applicable to the disclosure, such as a back propagation neural network (BPNN) algorithm, a general regression neural network (GRNN) algorithm, a radial basis function neural network (RBFNN) algorithm, a simple recurrent network (SRN) algorithm, a support vector data description (SVDD) algorithm, a support vector machine (SVM) algorithm, a multiple regression (MR) algorithm, a partial least squares (PLS) algorithm, a nonlinear iterative partial least squares (NIPALS) algorithm, or a generalized linear models (GLMs), etc. Thus, the disclosure is not limited thereto.

Figure 9:
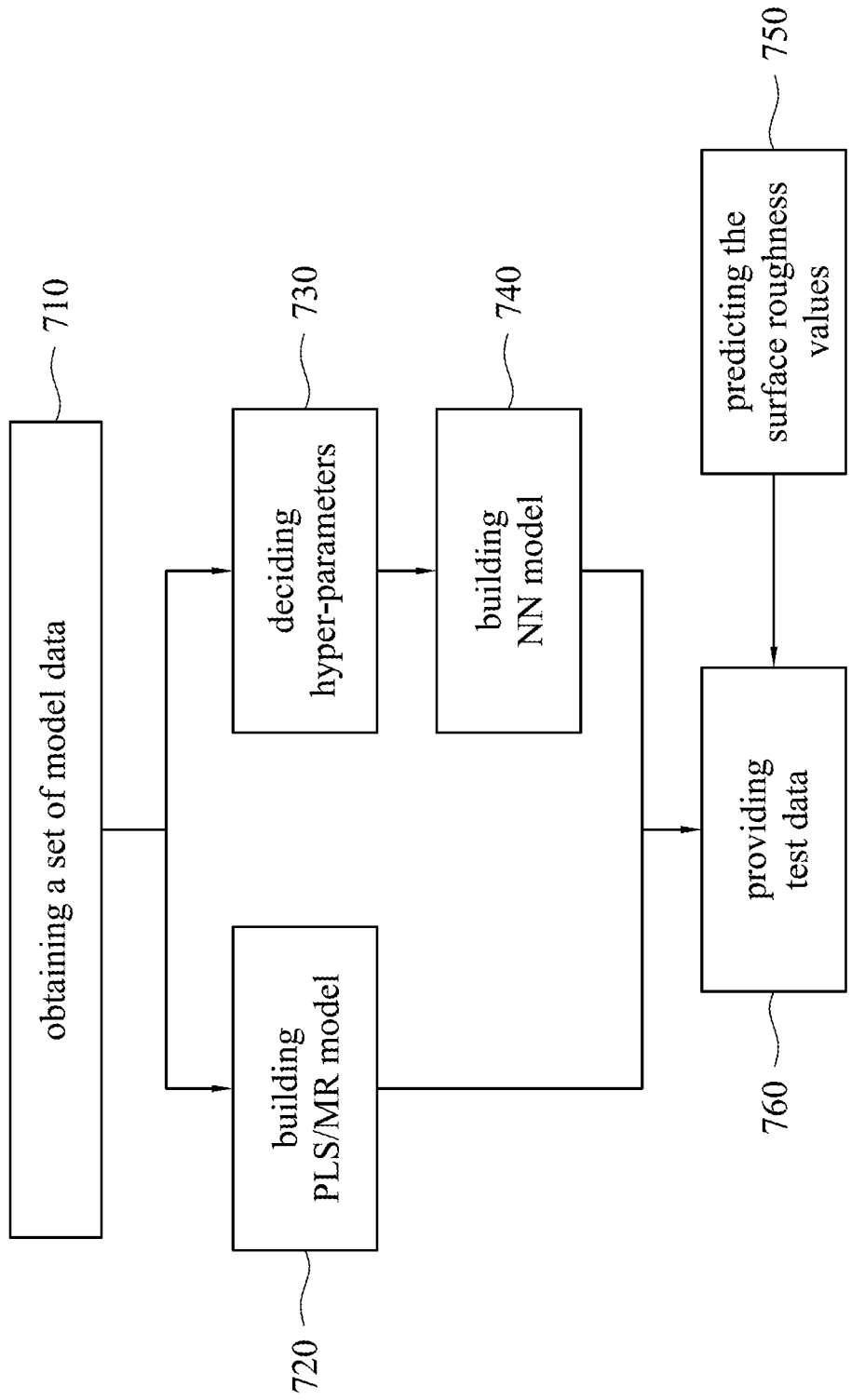
FIG. 9 shows a flowchart of an automatic virtual metrology (AVM) system workflow according to some embodiments of the disclosure.

Referring to FIG. 9, FIG. 9 shows a flowchart of the AVM system 640 workflow according to some embodiments of the disclosure. Starting from operation 710, operation 710 is performed to obtain a set of model data. Then, operation 720 is performed to build the PLS/MR model and operation 740 is performed to build the NN model. In implementing the NN model, operation 730 is performed before operation 740, in which operation 730 is to decide hyper-parameters (i.e. epoch number, momentum, learning rate and number of nodes), which affect the neural network performance a lot. Operation 750 is performed to provide test data. Then operation 760 is performed by employing outcomes of the two models to predict the surface roughness values. In some embodiments, the hyper-parameters are tuned automatically using a memetic-genetic algorithm (MGA). The AVM system 640 used in the embodiments of the disclosure may be based on U.S. Patent Publication No. 20200147893 and U.S. Patent Publication No. 20200247064, which are hereby incorporated by reference.

According to some embodiments, performing the laser powder bed fusion process with the method 100, the method 500 and/or the IAMA 600 enable the mean surface roughness to be controlled to a level lower than the surface roughness threshold. Moreover, the mean and standard deviation values of the surface roughness are significantly lower than samples produced by a traditional laser powder bed fusion process without controlling the surface roughness. Additionally, compared to the traditional laser powder bed fusion process, performing the laser powder bed fusion process with the method 100, the method 500 and/or the IAMA 600 improves average tensile strength of the workpiece from 903 MPa to 1013 MPa and reduces the standard deviation from 101.4 MPa to 69.5 MPa, in some embodiments. As a result, the method 100, the method 500 and/or the IAMA 600 can control the quality of laser powder bed fusion processed workpiece through controlling the surface roughness of every layer.

It is understood that the aforementioned steps or operations described in the embodiments of the disclosure can be combined or skipped, and the order thereof can adjusted according actual requirements. The aforementioned embodiments can be realized as a computer program product, which may include a machine-readable medium on which instructions are stored for programming a computer (or other electronic devices) to perform a process based on the embodiments of the present invention. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present invention also can be downloaded as a computer program product, which may be transferred from a remote computer to a requesting computer by using data signals via a communication link (such as a network connection or the like).

It is understood that the aforementioned steps described in the embodiments of the disclosure can be combined or skipped, and the order thereof can be adjusted according actual requirements.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims.

What is claimed is:

1. An additive manufacturing (AM) method, comprising:
providing a powder bed, wherein the powder bed includes a substrate and a powder layer disposed on the substrate;
performing a laser powder bed fusion (L-PBF) process on the powder layer with a set of fusion parameters data, wherein the set of fusion parameters data includes a first laser power value, a first scanning speed value, and a first hatching space value;
obtaining a set of property data regarding the powder bed, wherein the set of property data includes material properties and optical properties of a top surface of the powder layer;
obtaining a first surface roughness value of the top surface of the powder layer after the L-PBF process;
generating a first surface profile from the first surface roughness value based on a Gaussian probability assumption;
obtaining an absorptivity of the powder layer by using the first surface profile and the set of property data according to a bidirectional distribution reflection function (BRDF);
providing a set of re-melting process parameters data for performing a re-melting process on the powder layer, wherein the set of data of re-melting process parameters includes a second laser power value, a second scanning speed value, and a second hatching space value;
performing a heat transfer simulation to simulate the re-melting process, thereby obtaining a temperature distribution and an average melting period in a melt pool region by using the set of re-melting process parameters data, the set of property data, and the absorptivity of the powder layer;
calculating a cut-off frequency by using the average melting period and the set of property data, thereby obtaining a low-pass filter;
obtaining a second surface profile of the top surface of the powder layer after the re-melting process by using the first surface profile and the low-pass filter;
predicting a second surface roughness value of the top surface of the powder layer after the re-melting process based on the second surface profile;
iteratively adjusting the set of re-melting process parameters data to perform the heat transfer simulation until the second surface roughness value is smaller than or equal to a surface roughness threshold; and
performing a laser re-melting process on the top surface of the powder layer with the set of re-melting process parameters data after the L-PBF process.

2. The additive manufacturing (AM) method of claim 1, wherein the first surface roughness value is obtained by using a virtual metrology method.

3. The additive manufacturing (AM) method of claim 2, wherein the virtual metrology method is based on a neural network algorithm, a multiple regression algorithm, a back propagation neural network (BPNN) algorithm, a general regression neural network (GRNN) algorithm, a radial basis function neural network (RBFNN) algorithm, a simple recurrent network (SRN) algorithm, a support vector data description (SVDD) algorithm, a support vector machine (SVM) algorithm, a multiple regression (MR) algorithm, a partial least squares (PLS) algorithm, a nonlinear iterative partial least squares (NIPALS) algorithm, or a generalized linear models (GLMs).

4. The additive manufacturing (AM) method of claim 1, wherein the step of predicting the second surface roughness value comprises:
converting the first surface profile from a spatial domain to a frequency domain by a fast Fourier transform (FFT) algorithm;
applying the low-pass filter to the first surface profile in the frequency domain, thereby obtaining the second surface profile in the frequency domain;
converting the second surface profile from the frequency domain to the spatial domain by a fast Fourier transform algorithm; and
calculating the second surface roughness value from the second surface profile in the spatial domain.

5. The additive manufacturing (AM) method of claim 1, further comprising:
obtaining a plurality of melting periods corresponding to a plurality of nodal points in the melt pool region by using the temperature distribution; and
calculating the average melting period by using the melting periods and the nodal points.

6. The additive manufacturing (AM) method of claim 1, wherein the heat transfer simulation is a finite element heat transfer simulation.

7. An additive manufacturing (AM) method of performing a laser re-melting process, the method comprising:
obtaining a plurality of first roughness values of at least one powder layer which has been processed by a laser powder bed fusion (L-PBF) process with a set of fusion parameters data, wherein the set of fusion parameters data includes a first laser power value, a first scanning speed value, and a first hatching space value;

performing a simulation operation with respect to each of the first surface roughness values on each of the at least one powder layer, thereby obtaining a re-melting operation table including a plurality of sets of re-melting process parameters data corresponding to the first roughness values in a one-to-one manner, the simulation operation comprising:

obtaining a set of property data regarding one of the at least one powder layer, wherein the set of property data includes material properties and optical properties of each of the at least one powder layer;

generating a first surface profile from one of the first surface roughness values based on a Gaussian probability assumption;

obtaining an absorptivity of one of at least one the powder layer by using the first surface profile and the set of property data according to a bidirectional distribution reflection function (BRDF);

providing a set of re-melting process parameters data for performing a re-melting process on the one of the at least one powder layer, wherein the set of data of re-melting process parameters includes a second laser power value, a second scanning speed value, and a second hatching space value;

performing a heat transfer simulation to simulate the re-melting process, thereby obtaining a temperature distribution in a melt pool region and an average melting period by using the set of re-melting process parameters data, the set of property data, and the absorptivity of the one of the at least one powder layer;

calculating a cut-off frequency by using the average melting period and the set of property data, thereby obtaining a low-pass filter;

obtaining a second surface profile of the one of the at least one powder layer by using the first surface profile and the low-pass filter; and predicting a second surface roughness values of the one of the at least one powder layer based on the second surface profile; and iteratively adjusting the set of re-melting process parameters data to perform the heat transfer simulation until the second surface roughness value of the one of the at least one powder layer is smaller than or equal to a surface roughness threshold;

obtaining another roughness value of a top surface of another powder layer after the L-PBF process is performed on the top surface of another powder layer; and looking up another set of re-melting process parameters data by the another roughness value in the re-melting operation table, thereby performing a laser re-melting process on the top surface of the another powder layer with the another set of re-melting process parameters after the L-PBF process.

8. The additive manufacturing (AM) method of claim 7, wherein the first roughness values are located on the same powder layer.

9. The additive manufacturing (AM) method of claim 7, wherein the first roughness values are located on different powder layers.

10. The additive manufacturing (AM) method of claim 7, wherein the first roughness values are obtained by using a virtual metrology method.

11. The additive manufacturing (AM) method of claim 7, wherein the another roughness value is obtained by using a virtual metrology method.

12. The additive manufacturing (AM) method of claim 11, wherein the virtual metrology method is based on a neural network algorithm, a multiple regression algorithm, a back propagation neural network (BPNN) algorithm, a general regression neural network (GRNN) algorithm, a radial basis function neural network (RBFNN) algorithm, a simple recurrent network (SRN) algorithm, a support vector data description (SVDD) algorithm, a support vector machine (SVM) algorithm, a multiple regression (MR) algorithm, a partial least squares (PLS) algorithm, a nonlinear iterative partial least squares (NIPALS) algorithm, or a generalized linear models (GLMs).

13. The additive manufacturing (AM) method of claim 7, wherein the first roughness values are located on different powder layers that are disposed on different substrates respectively.

14. The additive manufacturing (AM) method of claim 7, wherein the step of predicting the second surface roughness value comprises:

converting the first surface profile from a spatial domain to a frequency domain by a fast Fourier transform (FFT) algorithm;

applying the low-pass filter to the first surface profile in the frequency domain, thereby obtaining the second surface profile in the frequency domain;

converting the second surface profile from the frequency domain to the spatial domain by a fast Fourier transform (FFT) algorithm; and calculating the second surface roughness values from the second surface profile in the spatial domain.

15. The additive manufacturing (AM) method of claim 7, wherein the heat transfer simulation further comprises:

obtaining a plurality of melting periods corresponding to a plurality of nodal points in the melt pool region by using the temperature distribution; and calculating the average melting period by using the melting periods and the nodal points.

16. The additive manufacturing (AM) method of claim 7, wherein the heat transfer simulation is a finite element heat transfer simulation.

* * * * *